Sept. 9, 1941.                    W. B. BREWER ET AL                    2,255,646
                                  TIRE MAKING MACHINE
                                  Filed April 23, 1938                  3 Sheets-Sheet 2
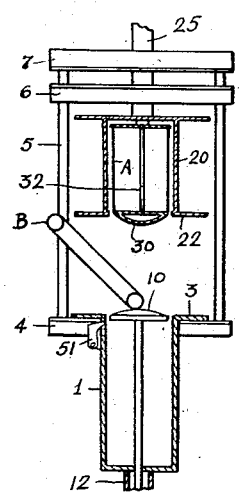 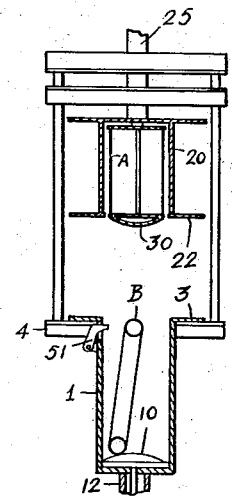 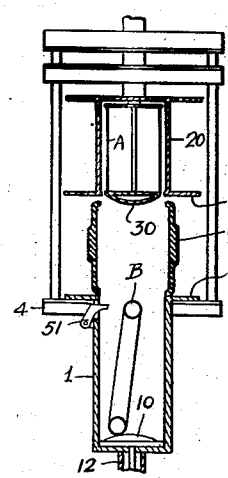 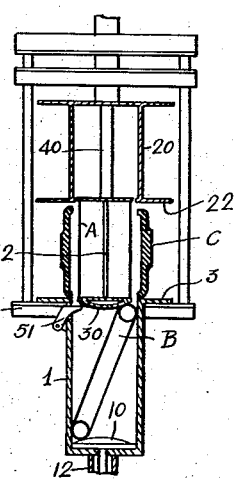
Fig. 3          Fig. 4          Fig. 5          Fig. 6
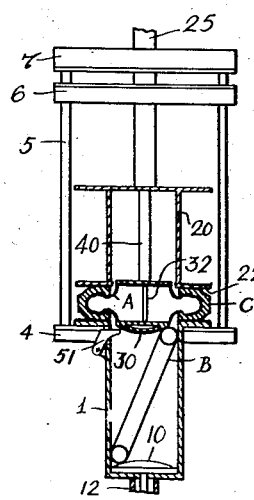 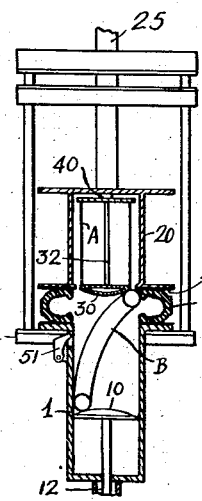 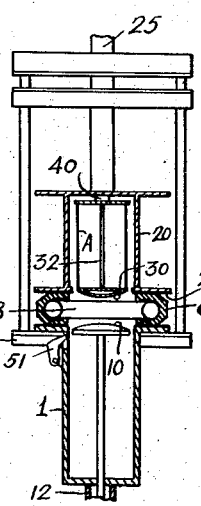 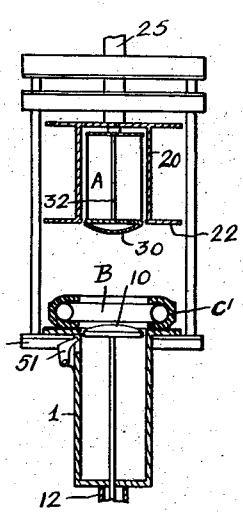
Fig. 7          Fig. 8          Fig. 9          Fig. 10
INVENTORS.
William B. Brewer
Charles L. Frost and
Howard Karg
BY Ray, Oberlin & Ray
ATTORNEYS INVENTORS.
William B. Brewer
Charles L. Frost and
Howard Karg
ATTORNEYS.

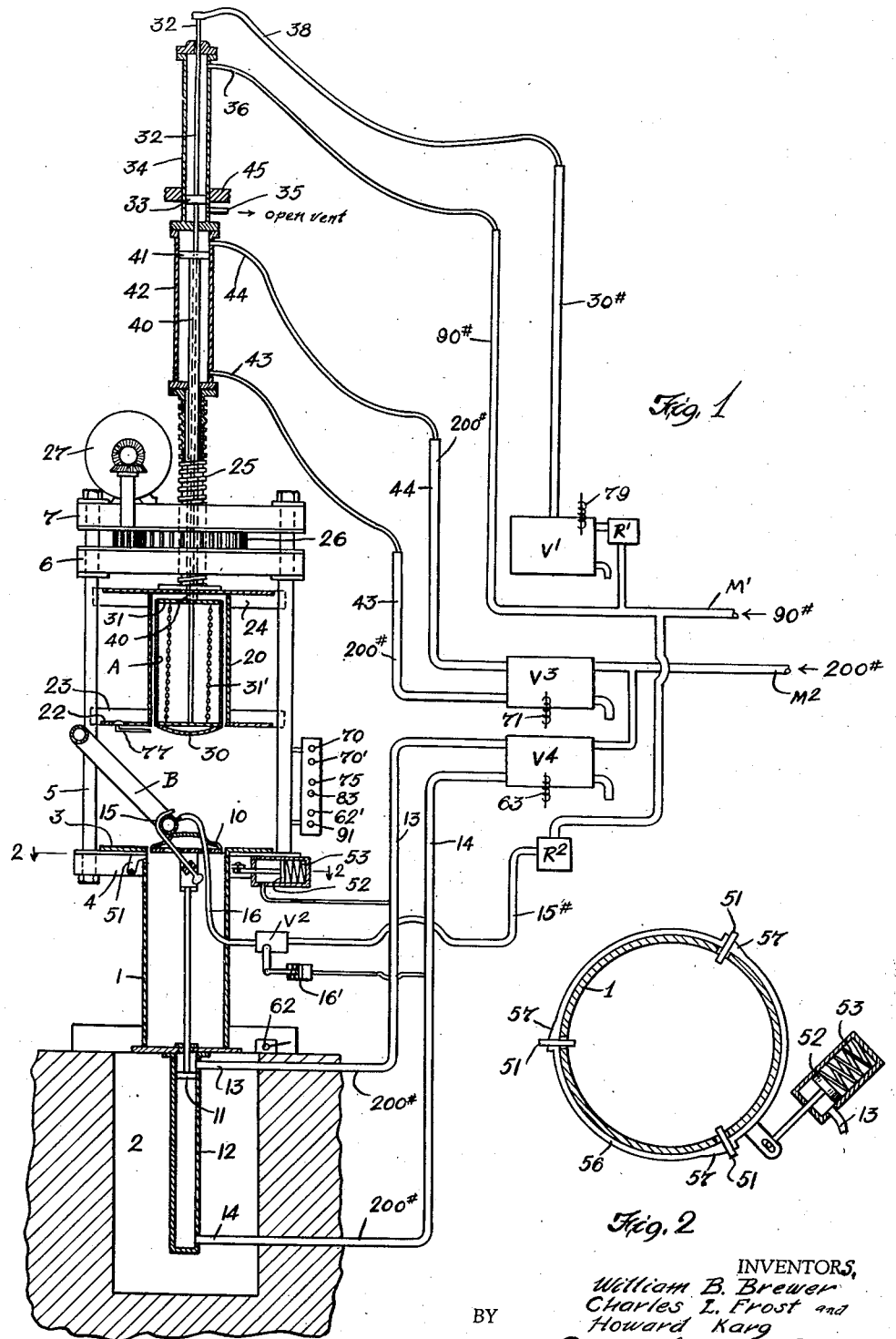

Patented Sept. 9, 1941

2,255,646

UNITED STATES PATENT OFFICE 2,255,646

TIRE MAKING MACHINE

William B. Brewer, Charles L. Frost, and Howard Karg, Findlay, Ohio, assignors to Master Tire & Rubber Corporation, Findlay, Ohio, a corporation of Delaware Application April 23, 1938, Serial No. 203,782

7 Claims. (Cl. 18—2)

This invention pertains to the field of tire making and involves a machine and method whereby drum built tires can be expanded and the curing bags be inserted therein, thus making them ready for the next stage, which is the curing mold. Our invention, thus, covers a machine and process which occupies in the complete manufacture of a tire, a position between the building drum and the curing mold.

Further aims of the invention are the elimination of heavy labor in the stage considered, more rapid operation, and particularly prevention of injury to the casing during its transformation from the band shape into the toroidal shape.

Other purposes are to make the apparatus of compact structure, thereby conserving factory floor space, to make it simple, durable, rugged and reliable, and to have an apparatus which operates with a minimum of power. Our invention also includes certain arrangements of pneumatic and electrical control whereby the expansion of the band and the insertion of the curing bag are accomplished by an automatic cycle of operations, with many parts of the machine interrelated to prevent false moves during the working cycle. Furthermore, the invention includes means for stopping the operation at certain intermediate stages where damage may occur to the material, the result being that although the cycle is fully automatic, its separate steps do not individually pass out of the control of the operator until a point has been reached where there is no further possibility of material going wrong or being damaged.

To the accomplishment of the foregoing and related ends, said invention, then, consists of the means hereinafter fully described and particularly pointed out in the claims.

The annexed drawings and the following description set forth in detail certain means and one mode of carrying out the invention, such disclosed means and mode illustrating, however, but one of various ways in which the principle of the invention may be used.

In the accompanying drawings:

Fig. 1 is a composite view, showing the expanding and inserting mechanism, partly in elevation and partly in central section, with the piping and valves for the operating pressure system, in schematic arrangement, shown as connected thereto;

Fig. 2 is a horizontal section on the broken plane 2—2 of Fig. 1, but limited to the details of a latch and latch operating mechanism;

Figure 11:
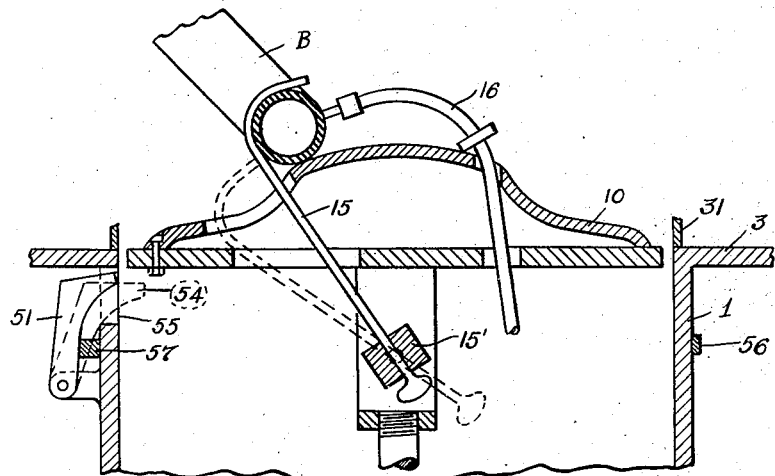
Figure 12:
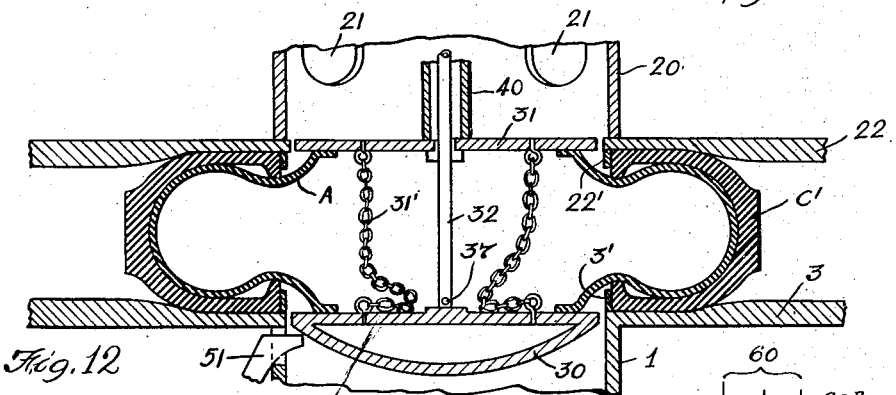
Figure 13:
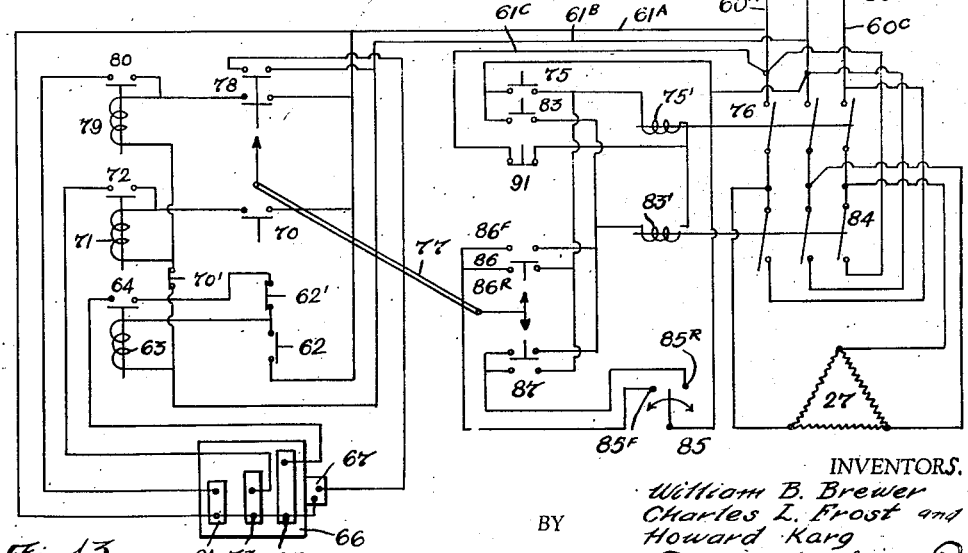

Figs. 3 to 10 inclusive are vertical central sections of our machine, diagrammatic, skeletonized, and with some parts in elevation, showing the successive steps of a complete operating cycle;

Fig. 11 is an enlarged detail from Fig. 1, showing bag manipulating elements;

Fig. 12 is an enlarged detail from Fig. 7, showing the tire casing expanded; and Fig. 13 is a wiring diagram of the electrical controls.

Our method comprises, briefly, supporting the curing bag and tire casing at a convenient level for the initial and terminal steps of our process, with respect to which level the bag and casing are subject to various manipulations by sequential movements of suitable instrumentalities from below and above, from and toward the level of support, the tires being expanded and the bags inserted by such manipulations. In more detail, the curing bag B is first hooked to a movable head 10 at the level of a work table 3, Figs. 1 and 3; the head 10 is lowered, pulling the bag down into a well housing 1, Fig. 4; the tire casing C, in band form, is placed on the work table 3, Fig. 5; the casing is expanded to the toroidal shape C' by the combined effects of a lowering squeeze head 22 and an internal expanding apron A, Fig. 7; the apron is withdrawn and the bag is pushed up from below, Fig. 8, so that the bag takes the place formerly occupied by the apron within the casing, Fig. 9; the squeeze head 22, apron A, and associated parts are lifted out of the way, Fig. 10; and the casing C' with bag B therein is removed, to be taken to the curing mold.

The mechanism is preferably operated by compressed air, which will be named for that purpose throughout the description, but it is to be understood that the use of other fluid pressure is within the range of the invention and that the principles of the invention may also be employed with substitution of mechanically equivalent driving and control means.

The apparatus comprises a frame supported on a well housing 1 above a pit 2, and having certain centrally disposed arrangements in the nature of plungers within and above the frame and also below a work table 3 supported on the lower yoke 4. The frame is formed by a bottom transverse yoke 4, fastened to the top of the well housing 1; vertical side rods 5; and closely spaced horizontal top yokes 6 and 7.

The lower plunger system comprises a domed head 10, detailed in Fig. 11, movable from top to bottom within the well housing 1 by a piston 11 in cylinder 12, with air connections 13 and 14 at top and bottom respectively. A hook 15, passing loosely transversely through a pivoted trunnion block 15' so as to fall open and out of the way, to the dotted position, Fig. 11, when not held up by the pull of the curing bag B, pulls the bag into the well when air is admitted at 13. When the head 10 is raised, by admission of air at 14, to insert the bag in the casing C' (Figs. 7 and 8), the domed shape of the head 10 and of an upper head 30, combined, force the bag to move into proper place in the casing C'. The bag B is inflated by a hose 16.

The upper movable system comprises a cage 20, which is a large hollow tube cut away as at 21 (Fig. 12) for lightness and access, carrying a squeeze plate 22 on its lower end by means of cross bars 23, and having other cross bars 24 on its upper end, both sets of cross bars guided on the frame 5. The work table 3 and squeeze plate 22 have aligned central openings and are concaved towards those openings. Positioning rings 3' and 22' are secured at the edges of the respective openings to position the beads of the casing.

A threaded shaft 25 is rigidly secured to the top of the cage, to be raised and lowered by a large internally threaded gear wheel 26, rotatably mounted between the lower and upper yokes 6 and 7 and driven by a motor 27 through a suitable gear train. The wheel 26 thus acts as a stationary nut upon the shaft 25, thereby raising and lowering the entire cage with all its connected elements, including the entire upper plunger system.

The upper plunger system includes an air-tight expanding apron A preferably of heavy but flexible rubber, connected at bottom and top to heads 30 and 31, respectively. These heads are also connected by chains 31' for a purpose described later. The lower head 30 is of a size to pass easily through the central opening of the squeeze plate 22 and into the central opening of the work table 3, and the upper head 31 moves loosely into the central opening of the squeeze plate 22. These heads are connected each to its own operating piston, each of such pistons working in a cylinder and such cylinders being successively mounted in axial prolongation of the threaded shaft 25. The piston rods are tubular. Appropriate packing glands are used wherever required.

Piston 33 on tube 32 in cylinder 34 is under constant downward pressure applied through hose 36, and the lower end of cylinder 34 is constantly open to atmosphere through vent 35. The operation of this piston is described subsequently. Air is admitted to and released from the apron A through the tube 32, which is perforated at 37, near its lower end, the hose 38 providing an air connection at the projecting upper end.

The tube 40, passing through shaft 25, and surrounding the lower part of tube 32, connects the upper head 31 with piston 41 movable in cylinder 42, with pressure connections 43 and 44. A steadying brace and guide 45 may be provided, through which cylinder 34 slides, and in general the structure may be braced as dictated by good engineering practice.

To limit the descent of head 30 into the well housing 1, a series of latches 51, Figs. 1, 2 and 12, are mounted near the top of the housing, actuated by a piston 52 movable in one direction by pressure from the line 13 and in the other by a spring 53. The preferred latch form is that shown in side view in Fig. 1, of inverted L shape, pivoted at the bottom, out from the housing, and with an inwardly directed nose 54, projecting through a slot 55 in the housing 1. The tendency, thus, is for each latch to fall into the closed position, Fig. 12, to prevent the head 30 from moving below the position shown. Suitable mechanism to actuate the latches comprises a ring 56 surrounding casing 1, carrying cams 57 which engage the latches to throw them out when the ring is rotated a few degrees by spring 58 upon release of air at 13, and allow them to drop in when pressure in 13 moves the ring counterclockwise. The spring 53 is stiff enough to delay the counterclockwise movement until head 10 has travelled below the latches. On account of the inward slope of the latches 51, the rising head 10 will always open them, irrespective of the action of the piston 52.

Air is conveniently supplied to our mechanism by two mains, carrying different pressures. The system of valves and piping is illustrated diagrammatically on the right side of Fig. 1, and the electrical controls are similarly shown in Fig. 13, certain features of which also appear in the valve diagram. Satisfactory results have been obtained by using 90 pounds to the square inch in main M', and 200 pounds in main $M^2$. For convenience in following this part of the description, typical pressures are marked opposite several of the air lines in Fig. 1, the letter "V" with an exponent is used for valves, and the letter "R" with an exponent, for reducers. The exhaust outlet for each valve is indicated by a gooseneck, not numbered.

From the main M' pressure is stepped down by a reducer R' to 30 pounds and led through valve V', line 38, piston tube 32 and orifice 37 to the interior of apron A. The valve V' is actuated by solenoid 79. Main M' also supplies air directly to the upper end of cylinder 34 through line 36. This pressure is constant; there is no valve in the line 36, and the lower end of cylinder 34 is always open at the vent 35. Air at 90 pounds from M' is also passed through reducer $R^2$, lowered to 15 pounds and used to feed the bag-inflating hose 16. Valve $V^2$ controls hose line 16, and is opened and closed by a spring-opposed piston 16'; opened when pressure is admitted to line 14.

The high pressure air from $M^2$ is connected through valve $V^3$ to the upper and lower ends of cylinder 42 by lines 44 and 43, respectively. Solenoid 71 actuates $V^3$. The bottom cylinder 12 is also supplied from $M^2$ at full pressure through valve $V^4$, from which lines 13 and 14 lead individually to the top and to the bottom of the cylinder. Air in the line 13 also opens latches 51 at certain stages of operation as later described. The valve $V^4$ is operated by solenoid 63.

The electrical system whereby the expanding and bagging process is carried through automatically is illustrated in Fig. 13 and includes the following-described elements operating as indicated. In the present arrangement power is taken from a three-phase main 60, and is illustrated accordingly, although this branch of the invention can of course be designed for other than three-phase current. The motor 27, represented in Fig. 13 by its field coils is carried on the three phase line, either through the forward switch 76 or through the reversing switch 84. A circuit 61A, 61B from two wires 60A and 60B of the power main 60 leads to a series of valve and other controls, and a wire 61C, also from 60A, leads to a series of controls for the motor 27. There is a certain amount of mechanical interconnection between the valve controls and the motor controls through a finger 77, Figs. 1 and 13, which is attached to the squeeze plate 22 in a position to be moved by contact with the upper bead of the unexpanded casing C when the squeeze plate 22 starts down. Further particulars of the electrical system are best described in connection with the operation of the entire apparatus, reference being had to Fig. 13 constantly and to Figs. 3 to 10 successively.

With the parts in the position of Fig. 3, cage 20 and plate 22 up; apron A in cage; head 10 up, latches 51 open, and foot switch 62 open, the operator lays the curing bag B on head 10, catches it under hook 15 and connects hose 16 to the bag. He then steps on the foot-operated starting switch 62 thus energizing coil 63, which opens the spring-loaded valve V⁴ admitting air to pipe 13; coil 63 also closes maintaining switch 64 on a circuit which includes the longest contact 65 of a three-contact time relay 66 actuated by motor 67, but the relay motor circuit is still open at 78. Air pressure above the piston 11 lowers plate 10, pulling the bag B down into the well housing 1. At the same time the pressure in 13 starts to move latch-operating piston 52 against its spring 53, but the spring delays the movement so that the latches 51 do not fall shut until head 10 is below them.

The starting switch 62 is spring-urged to open position, so opens as soon as the operator removes his foot, but the circuit is held closed through the spring closed push-button 62', which is an emergency stop, and through 64. Should the bag catch, or anything go wrong the operator can stop the head 10 instantly by pressing 62', which de-energizes solenoid 63 and moves V⁴ to relieve pressure above piston 11.

The parts are now in the position of Fig. 4, and the operator places the casing C, in band shape, on the table 3 around the guides 3', and closes spring-opened push-button switch 70, thereby energizing coil 71 which actuates valve V³ and also closes maintaining switch 72 on a circuit which includes contact 73 of the time relay 66, but does not start the relay motor 67, because 78 is still open. The valve V³ admits air through pipe 44 to the top of cylinder 42 and releases pressure at 43, thus lowering upper apron plate 31. Since there is constant pressure at the upper end of cylinder 34 the head 30, previously held up by chains 31' also moves downward, and thus the apron A, not expanded, is brought down inside the casing C, to the position of Fig. 6. The pressure of head 30 on the upper part of bag B relieves the tension on the hook 15 and the bottom of the bag pushes the hook sideways, where it disengages the bag.

The operator now presses the spring-opened push-button switch 75, energizing solenoid 75', which closes the three-pole magnetic switch 76, applying power for the forward direction of motor 27, Fig. 1 (the field coils only of the motor being shown in Fig. 13), which rotates the gear 26 and so lowers the cage 20 and squeeze plate 22. If any trouble develops, the operator can instantly stop the mechanism by pressing the push-button which opens stop switch 91. As the plate 22 goes down the adjustable finger 77, carried thereon (Fig. 1), touches the upper edge of the casing C, and is there tripped, closing the two-circuit limit switch 78. This switch, which is normally open, closes one circuit energizing the coil 79, and another circuit starting the time relay motor 67.

The control circuit of switch 76 is maintained by the plugging relay 85, closing at 85F. As the squeeze head 22 reaches its closed position, the finger 77 opens the side 86F of switch 86, and closes the side 86R; this plugs the motor 27 through the plugging relay contacts 85—85F, which are of conventional type, and which opens when the motor 27 stops.

The coil 79 closes the maintaining switch 80 on a circuit which includes contact 81 on time relay 66, which circuit also includes a stop switch 70', the latter normally spring closed. Coil 79 also operates the three-way valve V' to admit air through connections 38 and tube 32 to the expanding apron A, and the casing is thus squeezed and fully expanded, as indicated at C', Fig. 7; also see Fig. 12. The latches 51 prevent the head 30 from going down into the well housing 1. Since the expansion is concurrent with the squeezing the apron cannot buckle.

Air pressure is released from the apron by movement of valve V' due to cutting off current from coil 79 when the contact at 81 is broken by the time relay action. Contact 73 is next to open, breaking the circuit through coil 71 and setting valve V³ to relieve pressure above and apply it below piston 41, thus lifting the upper apron head 31. The chains 31' pull up the lower head 30; this is possible because of the greater area of piston 41 and the greater pressure applied thereto, as compared with the piston area and working pressure in cylinder 34. The apron A is thus replaced within cage 20, leaving the expanded but empty casing C' held down by plate 22 ready for the insertion of the curing bag B. The head 30 is still at the level of the upper bead of the tire.

As further travel of the time relay opens contact 65, failure of current in coil 63 causes valve V⁴ to admit pressure to the bottom of cylinder 12 through pipe 14 and open the upper connection 13 to atmosphere, with the result that head 10 rises. The latches 51 are opened by spring 53 at the same time, although, as previously pointed out, the rising head 10 will knock them out of the way without injury if the opening mechanism fails. Since air pressure holds the domed head 30 within the upper head of the casing C', the bag B is guided by the heads 10 and 30 into the casing. As head 10 starts the bag B upward, air pressure from line 14 behind piston 16', overcoming the opposed spring, opens valve V², admitting air for full expansion of the bag B.

The operator now presses reversing switch button 83, which energizes solenoid 83' and thus closes reversing switch 84 in the motor circuit, so reversing the motor 27 and raising the cage 20, plate 22 and other connected parts. Since the cylinders 40 and 32 are carried by the upper end of shaft 25, this raising of the cage system does not affect the relative positions of the heads 30 and 31, which remain at bottom and top, respectively, of cage 20, with the apron A between them. The motor 27 goes through its reverse cycle, plugging, at the end of the cage lift, through the switch 87 and the reverse side 85R of relay 85.

The various controls are arranged conveniently to the operator, for example in a foot pedal and on a button board, as shown in Fig. 1. To put the machine through its cycle the operator successively steps on the pedal of 62, presses the button 70, the button 75 and the button 83. Each step initiated by the foregoing can instantly be stopped by the operator in emergency, the stops being 62' for 62, 70' for 78, and 91 for either 75 or 83, and if stopped goes back to starting position, except that the motor must always be reversed by switch. It will be obvious that full automatic controls could be used if desired.

The timing relay 66 and the speed of the squeeze motor 27 are so regulated that the squeezing and expanding action is gradual, occupying about one-third of a minute in the preferred practice with present day materials, so as to avoid disrupting or otherwise injuring the plies of the uncured casing as its shape is changed. The three contacts of the relay are properly related to give the correct time for each step, including holding the casing expanded long enough for all plies to take a set in the expanded position before the bag is inserted and the casing taken from the machine. With rubber of the physical properties in common use in the tire industry today this is between half a minute and a minute.

Among the advantages of the invention are that the casings and bags are supplied to and removed from the machine at a convenient working level, that the machine can be stopped and automatically reset at any stage except the last, that the casing is expanded uniformly and gently by a combined simultaneous effect of internal outward pressure and endwise squeeze, that leakage of air into the plies of the uncured casing is impossible because of the protection afforded by the apron, that the automatic timing insures that the casing will be shaped gradually and uniformly so that the plies will not be violently shifted upon one another or torn apart and also that it will be held long enough in its toroidal shape in the machine to take an initial set before the bag is inserted.

Other modes of applying the principle of our invention may be employed instead of the one explained, change being made as regards the means and steps herein disclosed, provided those stated by any of the following claims or the equivalent of such stated means be employed.

We therefore particularly point out and distinctly claim as our invention:

1. An apparatus for shaping and bagging tire casings, comprising in combination a work table, a squeeze head, relatively slow-acting mechanical means for moving said squeeze head toward and from said work table, a pair of reciprocable heads and means for reciprocating the same relatively to each other and to said work table all mounted upon said squeeze head and movable therewith, a pressure-tight expansible apron carried between said reciprocable heads, an edge in said squeeze head defining an opening for passage of said apron, and said squeeze head adjacent said edge being adapted to engage the bead of a tire on said work table.

2. A bagging and expanding mechanism for drum-built tires comprising a work table, a squeeze plate parallel to said table and movable axially toward and from the same, a bag receptacle below said work table, edges in said work table defining an opening therethrough and in the upper end of said receptacle, means within said receptacle for selectively withdrawing a bag from the table into the receptacle and for pushing the bag upwardly out of the receptacle, edges in said squeeze plate defining an opening in axial alignment with said table opening, a flexible expanding apron above said table and admissible into a casing on said table through said squeeze plate opening, and operating controls for causing related sequential operation of said bag actuating means and of said squeeze plate and of said expanding apron.

3. In an apparatus of the character described, said apparatus including a work table on which curing bags and tire casings are both adapted to be set, a well opening at one end into said work table, mechanism for pulling a curing bag into said well and thereby elongating the same in a position below said table and for guiding and expelling said bag from said well, said mechanism including a centrally domed head transversely positioned in said well and movable longitudinally therein, and another centrally domed head mounted parallel to and in axial alignment with the first named head, but movable independently thereof through a tire casing on said work table into the top of said well, means for positioning said second named domed head selectively in the top of said well or within the upper bead opening of the tire casing, said domes being convex toward one another.

4. In combination in a tire shaper and bag inserter, a stationary apertured work table and an apertured squeeze head parallel thereto, the apertures in said table and in squeeze head being of circumference slightly less than that of a tire bead of the size for which the machine is intended; mechanism for moving said squeeze head toward and from said table, a plurality of axially aligned longitudinally successive cylinders carried by said squeeze head and extending therefrom in a direction away from said table, pistons and piston rods in said cylinders, heads carried by said rods between said cylinders and said work table, a flexible tubular fluid-tight apron having its ends respectively fluid-tightly attached to said heads and being movable by said heads into and out of a tire on said work table, means for application and release of fluid pressure to the interior of said apron, a well extending from said work table aperture in direction opposite to said cylinders, a bagging head in said well, bag engaging means on said head, means for moving said head toward and from said work table thereby to draw a bag into said well or expel it from said well, and control means co-ordinating the movements of all said elements.

5. Apparatus for shaping flat band tires and inserting bags therein comprising in combination a work table whereon the band is adapted to be placed, a well below said work table adapted for reception of a curing bag, a cage above said work table, a tire squeeze head secured to said cage, a pair of cylinders above said cage in axial prolongation of one another and in axial alignment with said well, pistons in said cylinders, a head movable longitudinally into and out of said well towards said work table, two heads movable longitudinally into and out of said cage and also toward one another by said pistons, a tubular apron having its ends secured to said heads, and means for bodily moving said cage with squeeze head and cylinders as a unit with reference to a tire on said work table.

6. In a tire expanding and bag inserting machine having a work table with a bag well therebelow and a casing expander thereabove, the combination in said casing expander of an apron on one side of a tire to be expanded and a bag well on the other side, heads to which the respective ends of said apron are in fluid-tight attachment, said heads being movable toward said bag well and the one in advance movable into the mouth of said bag well, a bag-lifting head movable up and down said bag well, and means at the mouth of said bag well adapted to positively limit movement of said apron head into said bag well while allowing travel of said bag-lifting head past the well mouth.

7. An apparatus for shaping and bagging tire casings comprising a table having an opening formed in the center thereof, a bag well extending below the table, a fluid cylinder and piston below said bag well, a bag controlling head in said well connected to said piston, a frame supported by said table structure, a squeeze head disposed above the table and guided by the frame, a cage extending above the squeeze head and means connected to the upper end of the cage for raising and lowering the squeeze head, apron means disposed within said cage comprising spaced top and bottom heads and a flexible apron sealed therebetween, means for moving said heads and apron into and out of said cage comprising fluid operated pistons and cylinders connected to said apron heads, flexible means interconnecting said apron heads to prevent the heads from being moved more than a predetermined distance apart, said squeeze head adapted to be lowered against a casing on said table and said cylinders adapted to lower the apron into the interior of the casing when the casing is on said table, and fluid pressure means connected to the interior of the apron to expand the apron into the interior of the casing.

WILLIAM B. BREWER.
CHARLES L. FROST.
HOWARD KARG.